Sept. 3, 1935.  Ö. RISZDORFER  2,013,362
AUTOMATIC DIAPHRAGM
Filed July 18, 1932
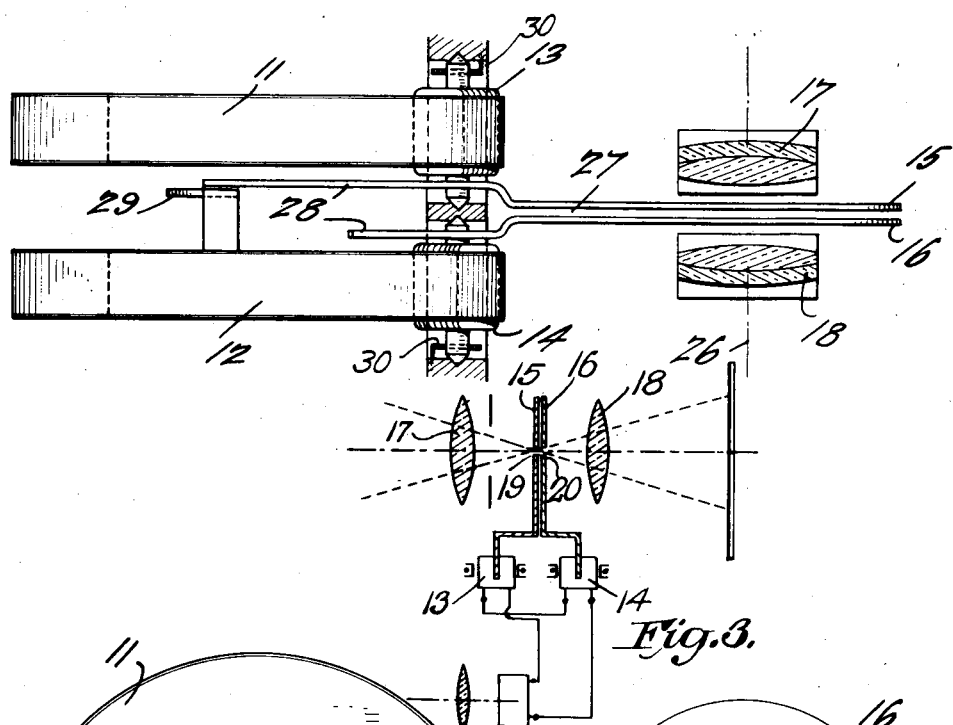
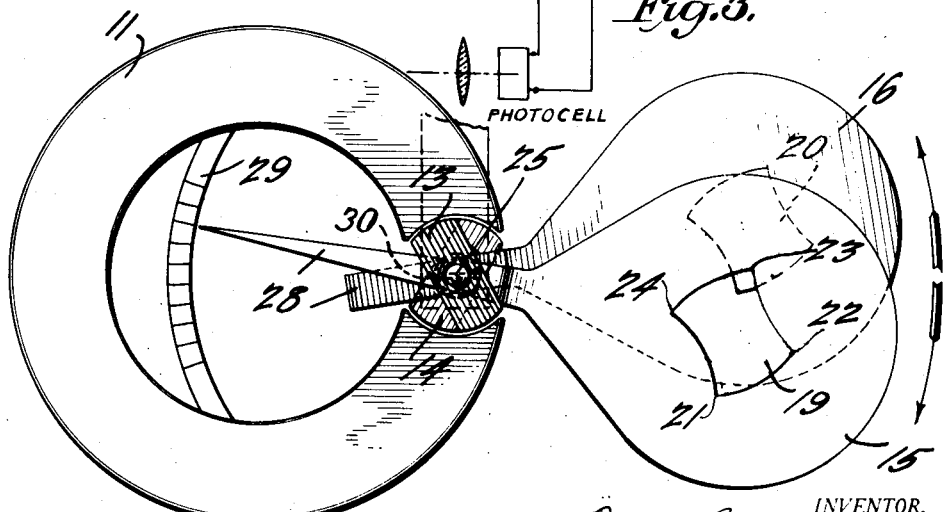
INVENTOR.
Odön Riszdorfer
BY
ATTORNEY.

Sept. 3, 1935.                    Ö. RISZDORFER                    2,013,363
                               PHOTOGRAPHIC APPARATUS
                                 Filed Sept. 12, 1932
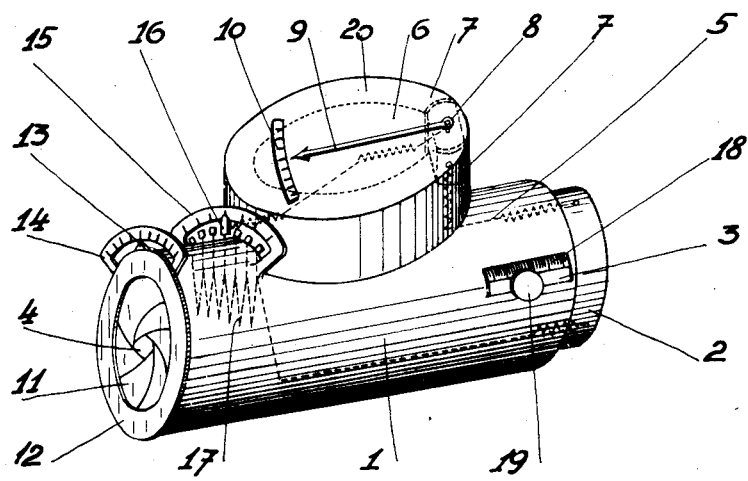
Fig.1
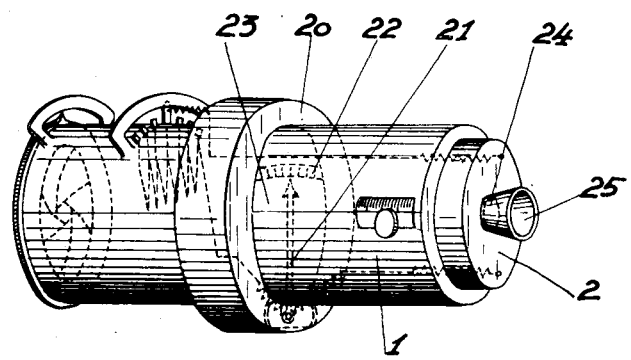
Fig.3.        Fig.2
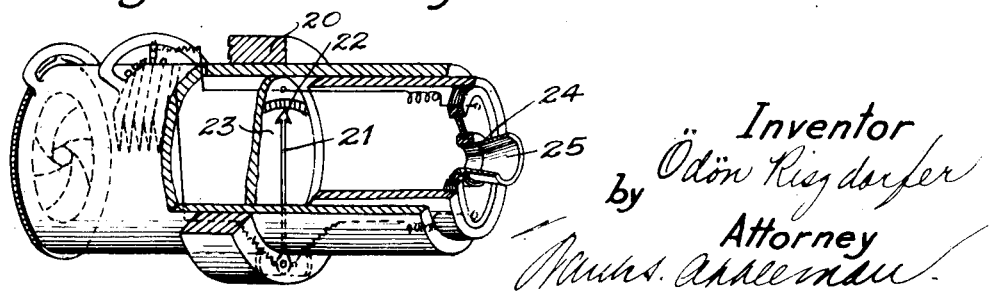
Inventor
by Ödön Riszdorfer
Attorney Patented Sept. 3, 1935

2,013,362

UNITED STATES PATENT OFFICE 2,013,362

AUTOMATIC DIAPHRAGM

Ödön Riszdorfer, Budapest, Hungary

Application July 18, 1932, Serial No. 623,216
In Hungary July 18, 1931

3 Claims. (Cl. 95—64)

The invention relates to apparatus adapted to vary the area of the light aperture of photographic cameras in which apparatus the screening members by means of which the light aperture is defined are actuated by the current of a photo-cell. Openings are provided in the screening members and the mutual arrangement of the screening members is such that the openings provided overlap each other in part or (in case of full opening) entirely, so as to allow the light sensitive emulsion to become exposed to light entering through the aperture thus formed.

An arrangement embodying my invention is shown, by way of example, on the accompanying drawing, on which:

Fig. 1 is a side view of the apparatus for varying the light aperture, parts of the same being in section;

Fig. 2 is a plan of the said apparatus;

Fig. 3 illustrates an apparatus for varying the area of light apertures of photographic cameras embodying the invention.

In these Figures 11 and 12 are two permanent magnets located one above the other, mutually co-axial coils 13 and 14 being provided to oscillate respectively, between the poles of each of the magnets referred to. The coils are fitted i. e. connected into the circuit of the photo-electric cell in such a manner as to make the deflections to which they will be subject mutually opposite in each case. Screen elements 15 and 16 located in mutually parallel positions on which elements square-shaped openings 19 and 20, respectively, are provided, are fixed on the oscillating coils 13 and 14. These openings are arranged so as to make the amount of their mutual overlap vary in proportion to the deflection the screening elements. When no current flows from the photo-cell, that is to say, when no currents flows through the spools 13 and 14, the two diaphragm elements 15 and 16 are in a position in which each diaphragm element correctly registers or covers the other diaphragm element and the diaphragm openings 19 and 20 register one with the other, and hence, the diaphragm is completely open. The stronger the current passing through the spools 13 and 14, the further the elements 15 and 16 will swing relative to each other in the directions of the arrows, (Fig. 2), and the smaller will become the opening of the diaphragm. When no light hits the cell, the current through the spools 13 and 14 is interrupted and they become deenergized and the shutters regain their normal positions, completely covering each other. The backward movement of the diaphragms into what may be regarded as the zero or initial position may be effected in any appropriate manner, as by employing a spring, exerting force on the spools 13 and 14 to cause a reverse of their movement counter to that into which they are moved when energized.

In the example shown the two screening elements are located between the two halves 17 and 18 of the object lens of the camera. In case square-shaped openings are employed, these openings are preferably arranged so as to make, in the case of both openings, the two corner points 21 and 23 situated opposite to each other, of each opening to be located at the same distance from the axis of oscillation and to form at the same time points of a circular arc passing through the optical axis of the object lens thus causing the two other corner points 22 and 24 to be located along one and the same radius. The reason why this arrangement is particularly favourable is that with this arrangement it will be two corner points which, during the movement of opening will come into mutual contact first, and that the shape subsequently formed during the further course of the movement of opening will be a symmetrical quadrangular shape, the centre of which will be situated in the optical axis of the lens system.

The screens possess parts 28 extending beyond the co-axial shafts 25 which parts are preferably made so as to balance those parts of the screens as have been cut out to form the openings. One of the counterweights is a pointer permitting the magnitude of the light aperture at any time to be read off scale 29. In the case of this arrangement all the resistance which in addition to the magnetic resistances has to be overcome by the current of the photo-cell consists in the pin frictions which in instruments of this kind are of very small magnitude. The openings may also be of other than square shape. Notably, the sides of the openings may also be curved instead of straight-lined, thus enabling the centre of the light aperture to be permanently kept in the optical axis. It is immaterial from the point of view of the invention whether the diaphragm is placed in front of the object lens, behind the object lens or between the individual lenses forming the object lens. Of course, the screening elements may also be more than two in number.

What I claim is:

1. In a photographic camera, the combination of diaphragms, said diaphragms having openings through both of which light is projected when in operation, means for oscillatively mounting the diaphragms for movement parallel to each other, means whereby current of a photo-electric cell moves the said diaphragms relative to each other, and tensioning means for the diaphragms having progressively increased resistance as the diaphragms move toward the open positions.

2. In a photographic camera, the combination of diaphragms, means for oscillatively mounting the diaphragms on a common axis and parallel to each other, the said diaphragms having quadrangular openings through both of which light is projected, means energized by current of a photo-electric cell for moving the said diaphragms, and tensioning means for the diaphragms having progressively increased resistance as the diaphragms move toward the open positions.

3. In a photographic camera, the combination of diaphragms, means for oscillatively mounting the diaphragms on a common axis and parallel to each other, the said diaphragms having quadrangular openings through both of which light is projected, the sides of the openings being curved, means energized by current of a photo-electric cell for moving the said diaphragms, and tensioning means for the diaphragms having progressively increased resistance as the diaphragms move toward the open positions.

ÖDÖN RISZDORFER.